United States Patent [19]
Piskiel et al.

[11] Patent Number: 6,101,556
[45] Date of Patent: Aug. 8, 2000

[54] METHOD FOR CONTENT-BASED DYNAMIC FORMATTING FOR INTEROPERATION OF COMPUTING AND EDI SYSTEMS

[75] Inventors: Harold Aron Piskiel, Manalapan, N.J.; John Arthur Carter, Beverly, Mass.; Christopher Blair Preston, Englewood, Colo.

[73] Assignee: New Era of Networks, Inc., Englewood, Colo.

[21] Appl. No.: 08/779,595

[22] Filed: Jan. 7, 1997

[51] Int. Cl.[7] .................................................. G06F 9/00
[52] U.S. Cl. ............................................................ 709/313
[58] Field of Search .................................... 709/300–305

[56] References Cited

U.S. PATENT DOCUMENTS

| | | | |
|---|---|---|---|
| 4,994,998 | 2/1991 | Anezaki | 704/1 |
| 5,291,583 | 3/1994 | Bapat | 395/705 |
| 5,579,521 | 11/1996 | Shearer et al. | 709/300 |
| 5,638,066 | 6/1997 | Horiuchi et al. | 341/60 |
| 5,848,415 | 12/1998 | Guck | 707/10 |

*Primary Examiner*—Alvin E. Oberley
*Assistant Examiner*—St. John Courtenay, III
*Attorney, Agent, or Firm*—Daniel N. Fishman; Chrisman Bynum & Johnson

[57] ABSTRACT

A method and associated structures for dynamically reformatting messages in a distributed computing environment based upon message content as represented by a description of the input message format and the output message format. An input message received by the formatter of the present invention is decomposed into a canonical format stored by the formatter for further use in a rapidly searchable data structure (FGA). The input message data is decomposed in accordance with an input message format description which describes the content of the input message in terms of atomic data types and structures. An output message is then generated in response to a user request and in accordance with a user provided output message format description. The output message format description describes the content of the output format in terms of atomic data types and attributes as well as functional operations performed to derive the output field value. Related fields in an input message format, an output message format, and in the FGA are correlated by a common ID value associated with each field. The present invention thereby obviates the need, common to prior techniques, to construct a large number of procedures for conversion among any of a large number of input and output message formats. The present invention supports a rich set of atomic data types and attributes including complex, compound (e.g., repeating or recursively defined) message formats as well as mathematical, lookup, logical branching, and user callout functions applied to derive an output field value.

20 Claims, 9 Drawing Sheets

METHOD FOR CONTENT-BASED DYNAMIC FORMATTING FOR INTEROPERATION OF COMPUTING AND EDI SYSTEMS

FIELD OF THE INVENTION

The present invention relates to message communication subsystems in a distributed computing environment. In particular the present invention relates structures and methods for content-based, dynamic formatting of messages exchanged between computing applications and electronic data interchange (EDI) systems using declarative (descriptive) configuration tables and dynamic (runtime) determination of actual conversion methods.

PROBLEM

A large class of data processing applications distribute processing among a plurality of processes. These processes may be operable within a single computing device or may be distributed among a plurality of interconnected computing systems (e.g., a network or cluster of systems). Such distributed applications serve to decouple application processes from a particular data processing hardware topology.

It is typical in such applications that messages are transmitted between the various nodes or processes in such a distributed computing application. These messages are used to synchronize, and maintain the integrity of the data distributed among the nodes of the distributed computing environment or to direct processing to the appropriate distributed node or process.

As used herein, distributed systems or distributed computing environment refers to the computational environment in which a plurality of computing processes exchange messages to coordinate a computing application. As noted, the processes may be co-operable within a single computing system or distributed over a plurality of interconnected computing systems. The term distributed computing environment, as used herein, therefore refers to an environment embodying the distribution of a computing task among a plurality of processes which communicate via the exchange of messages.

Messages exchanged between such systems may be said to have a format associated therewith in that certain fields or portions of the message are designated to provide particular portions of the information content of the message. Messages processed in each data processing system tend to use a format unique to the requirements of that particular application. Sometimes related groups of distributed applications that happen to share a common development genealogy will share a common message format. However, as complex systems grow and evolve it is often the case that different systems within the distributed environment utilize different message formats. It is therefore a problem in communications between distributed computing systems and applications to reformat messages to be exchanged between incompatible systems.

It is known in the art to provide services within the distributed computing environment for reformatting messages to be exchanged between incompatible systems. Such reformatting services are provided to the application programs and systems as an application program interface specification (API) or integrated in other manners with the message routing (i.e., within message publishing services or message transmission services). Reformatting services include the translation of an input message format (a first application designed format) to a standardized (canonical) format for purposes of further processing, as well as reformatting of an input message format into a desired output message format (a second application defined format).

However, reformatting services as presently known in the art are generally procedural in nature in that a specific procedure or method is supplied by the reformatting services for translation from each possible combination of an input message format with an output message format. Where the number of message formats is large, as is common in complex distributed applications, the number of such procedures is exponentially large. For example, if there are 50 unique message formats within a distributed system, then the number of procedures to translate all possible input/output message format pairs is on the order of $50^2$ (more precisely, $(50 \times 49)/2$ procedures are required). The number of procedures required to completely define all possible message reformatting requests is therefore exponential in the number of message formats to be supported. Specifically the number of procedures required for N format specifications is $(N \times (N-1))/2$. Though some conversions may be culled from the complete set of possible conversion, it is not uncommon for all possible conversions to be required in such message exchange distributed computing environments.

In addition, the known procedural techniques for reformatting require the generation and addition of N new procedures in order to add the N+1th new format. The known procedural methods for re-formatting are therefore difficult to scale as the needs of the distributed computing applications change over time. Known procedural techniques for message reformatting are therefore difficult to maintain and extend as distributed application requirements change over time.

It is apparent from the above discussion that a need exists for an improved method and structure for reformatting of messages in distributed computing applications. Specifically, a need for an improved method and structure which provides enhanced flexibility and scalability as compared to known procedural techniques.

SOLUTION

The present invention solves the above and other problems, to thereby advance the state of the useful arts, by providing methods and associated structure for reformatting messages in accordance with a content based description (declaration) of each supported format. In particular, the present invention provides for data structures to describe each format supported within the distributed application. The data structures permit the description of simple as well as highly complex format specifications. Methods of the present invention are applied in conjunction with the data structures to parse a received message according to the input message format description. Further methods of the present invention may then generate a message in accordance with an output message format or to return output data requested by an application.

All form descriptions are in terms of canonical (also referred to as standardized or atomic) data types. Any of a received message or any field of an output message to be generated may be defined in terms of these atomic data types. Each field of a message being parsed is processed in accordance with the format description associated with that field of the received message to derive a canonical format instantiation of that field. The derivation may include simple type translations as well as complex functions such as mathematical derivation, default values, table (database) lookups, user callouts (exits), etc. Additionally, a format specification may include repetition of formats, conditional branching in the format specification, and hierarchical (recursive) definition of format structures. Likewise, each field of a message being generated by the methods of the present invention is generated from the canonical format description of the data to be output and re-formatted in accordance with the format specification associated with that field of the output message.

Any field of any received message may therefore be parsed by the methods of the present invention. Similarly, any output message may be generated in response to receipt of an input message. In both cases, that of parsing a received message and that of output message generation, the methods of the present invention process each message in accordance with their respective format descriptions. No specific procedures are required, as taught in the prior techniques, to reformat each of the possible combinations of input message formats and output message formats.

The present invention thereby provides a flexible and scaleable structure and method for reformatting messages as is often required in distributed applications. A new message type requires a user only to add a description of the format of the new message type in terms of the canonical data types (including repetition, recursion, logical and arithmetic operations, etc.). In accordance with the present invention the new message type (new format) may be converted to any of the other formats already known to the system without the need to construct a specific procedure associated with each new conversion. The present invention thereby obviates the exponential efforts involved in known procedural techniques for maintaining and scaling the reformatting of messages in distributed application environments.

More specifically, the present invention provides for describing a message format as a plurality of field format specifications. Each field format specification may be any of several types including simple literal fields (data values with or without delimiters and with or without tag and structural information associated therewith) as well as complex recursive and repeating compound field constructs comprising a plurality of literal fields and associated structure.

An input message is parsed to produce values in canonical format for each field of the received input message. The fields of the input message are stored in a data structure within the formatter of the present invention to enable rapid searching for the field values. The data structure, also referred to herein as the field group array (or FGA or field array), contains a description of the input field in canonical (atomic) format used internally by the formatter. Entries in the FGA include an ID value to identify the field and associate it with corresponding input and output message format specifications. Actual data resulting from the parse of an input message is then associated with the entry in the FGA corresponding to the field ID from which the data value is parsed. The data associated with a particular field ID in the FGA may be either contiguous with the field's FGA entry or referenced indirectly via, for example, pointer information pointing to the input message data.

The data structures utilized in the preferred embodiment of the present invention comprise K-trees. K-tree structures and methods for their general application are described in K-Tree Container Data Structures, Rodney Bates, Dr. Dobbs Journal, September, 1994. A K-tree structure is generated to represent the input message format description. Responsive to a user (process) request, a tree is generated to represent a particular output message format description. Related fields from the input message are mapped to corresponding fields in the output message to generate the output message tree structure. The K-tree data structures and associated methods of the present invention permits rapid mapping of related fields between the input and output message format tree structures. One skilled in the art will recognize many other well known data structures and associated search methods which may be applied to rapidly locate fields in the input message and map them to corresponding fields in an output message being generated.

In initially defining a format for a field of a specific message, an ID value is associated with the fields format specification. Field format specification known to the system are stored in tables of a database associated with he formatter of the present invention. The ID value and related instance identification information in each format specification serves as the primary key in accessing entries in these database tables. An ID value for a field takes on any of several standardized, pre-defined values to identify the type of information stored in the field. For example, information in fields of messages associated with identification of a person may include such canonical ID values as first name, last name, social security number, address, birth date, etc. Or for example, information in fields of messages associated with financial transactions may include institution name, institution id (e.g., bank routing number), transaction type, transaction amount, payee information, etc.

The present invention includes a rich set of atomic format types including simple non-repeating formats as well as complex or compound formats which include repeating or recursive compositions of simpler format types. Format types also include operations to derive a value from mathematical, table lookup, or other functions applied to a corresponding input field value. Furthermore, format specifications for output message fields may include "callouts" to user supplied functions to perform more advanced translation (mapping) of the corresponding input field values to the desired output message field format. For example, a name field in the input message could be used to lookup an associated ID number in an application specific database used by the system associated with the output message format.

The defined data types are stored in a repository (also referred to as a format dictionary) for retrieval by a user in creating a new format description (declaration). When adding a new message format, the designer (user) utilizes pre-defined field format types (field ID values) where appropriate. However, when a new message format includes a field for which none of the canonical field ID values apply, the user may add a new field ID value to the format dictionary used by the formatter of the present invention.

In response to invocation of the formatter of the present invention to generate an output message, the formatter reads the format specification for the requested output message to build a K-tree data structure corresponding to the requested output message format then maps corresponding values from the input message into the fields of the output message data structure. The ID value of the fields in the FGA and the input and output message format specification serve to correlate the fields. The input field value so located is then used to derive the corresponding output field of the output message. The resultant output message is then returned or transmitted for further processing outside the formatter of the present invention.

Input message fields are mapped to corresponding output message fields in accordance with the field ID values of the associated fields. For example, a last name field of the output message receives the corresponding last name field from the input message because the field ID values of the two fields correspond. The details of the input field as specified in the input message format specification determine the types of data conversion required to map the input message field value to the output message field value. In addition to such implicit mapping between input and output fields based upon field ID values, a format specification may provide explicit mapping instructions so as to derive an output field value from an explicit mapping of otherwise unrelated input field values.

Methods of the present invention perform such mapping and conversion steps for each field in the output message to be generated. Compound output message field formats cause the methods of the present invention to repeat and/or recurs as required to generate all required fields in the output message. Indicia stored in the field array (FGA) and in the K-tree structure representing the input message are used to correlate specific instances of repeating input format specifications with appropriate output message data. Specifically, the indicia are used by the methods of the present invention to coordinate the recognition of sequences of repeating data fields and to map related instances of repeating input message fields to output message fields.

The formatter of the present invention may be invoked by either of two standard interface methods. First, as noted above, the formatter may be invoked to reformat an input message into a desired output message format. In such a case, the formatter is invoked and supplied with the input message and the desired output message format specification. The formatter locates the input message format description based upon its message type and then returns an output message formatted in accordance with the supplied output format. Values in the output message are mapped and translated from corresponding fields of the input message. Secondly, the formatter may be invoked to return individual fields from an input message so as to parse a variety of input message formats into canonical fields for use, for example, in a publisher/subscriber message distribution system.

The above and other objects, aspects, features, and advantages of the present invention will become apparent from the following description and the attached drawing.

DETAILED DESCRIPTION OF THE PREFERRED EMBODIMENT

Figure 1:
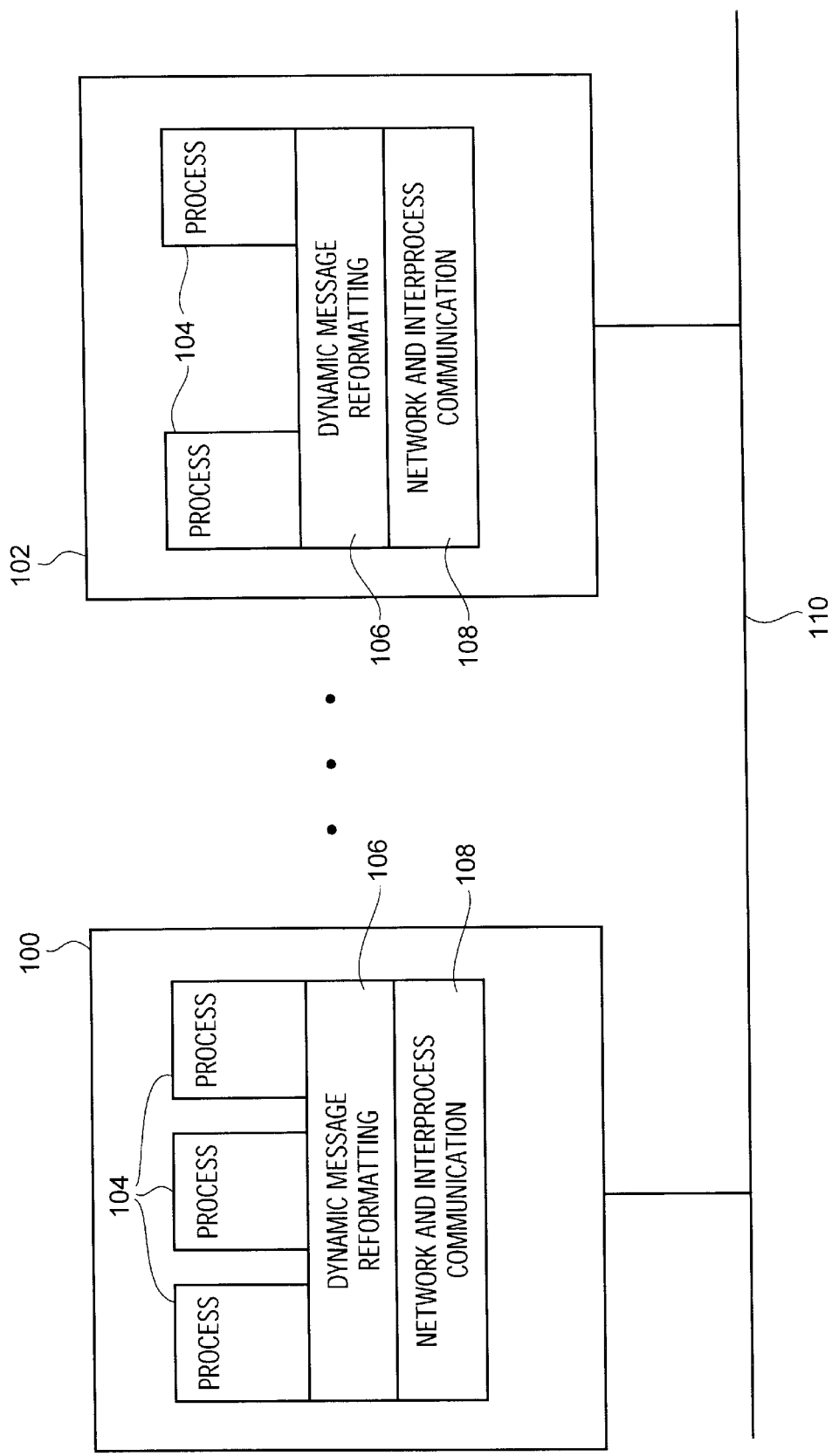
FIG. 1 is a block diagram of a distributed computing environment in which the dynamic formatter of the present invention is operable.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Distributed Applications—Overview

FIG. 1 is a block diagram depicting a distributed computing application environment in which a plurality of nodes (systems or processes within systems) communicate. Specifically, system 100 and system 102 communicate via communication medium 110. A plurality of processes 104 are distributed among the systems 100 and 102. The processes 104 and system 100 and 102 utilize network and interprocess communication services 108 to exchange messages between the various processes. The present invention provides services to the processes 104 to allow flexible, scaleable, dynamic reformatting of messages exchanged among the processes 104. Specifically the dynamic message reformatting service 106 in each system 100 and 102 provides an API through which the processes may translate received messages into a preferred format for use within the receiving process or may translate messages destined for another process into the preferred format for such other process.

One skilled in the art will readily recognize that such a distributed computing environment may be embodied within the plurality of cooperating processes whether operable within a single computing system (e.g., 100 or 102) or within a network of computing systems (e.g., 100 and 102). FIG. 1 is therefore more generally representative of a plurality of processes performing a task in a distributed manner. FIG. 1 therefore represents any interprocess communication path regardless of the physical topology in which the distributed processes are operable and the medium by which messages are exchanged. The structures and methods of the present invention are operable in conjunction with all such distributed application environments.

As noted above, it is common in such distributed application environments that the individual processes manipulate messages in accordance with different formats. For example, the processes may be operable on a variety of disparate computing systems which each utilize unique formats for message exchange—e.g., a heterogeneous network of computing systems. Or for example, the processes may be developed and enhanced independently over time such that newer processes utilize different message formats than older processes. For many reasons, different processes in a distributed application environment may each utilize different message formats for performing their specific processing.

Despite broad variety of message formats, each of the processes in the distributed application may be required to exchange messages with others of the processes in the application. The distributed application therefore requires that messages exchanged between the nodes (processes) of the application be translated from one format useful to the producer of the message to another format useful to the consumer of the message.

Transaction processing applications are one common class of distributed applications operable in the distributing computing environment depicted in FIG. 1 in which rapid, flexible translation of message formats is critical. Transaction processing applications typically manipulate data throughout an enterprise that may be distributed in a plurality of cities or even a plurality of countries across the globe. Further, such distributed transaction processing applications may include a heterogeneous mixture of varying computer systems, recovery management subsystems and/or DBMSs, and communication protocols. Such applications have needs for manipulating common data and simultaneously require rapid transaction response at each of the local distributed nodes. To achieve both goals, it is common to use distributed computing techniques in the transaction processing application to maintain consistent centralized data available to all nodes while distributing and maintaining remote copies of frequently used data. When transactions are processed in such applications, messages are exchanged with appropriate nodes in the distributed computing environment which may require knowledge of the completion or occurrence of the transaction.

Examples of complex, distributed, transaction processing applications requiring reliable, robust, rapid exchange of messages include: financial securities and exchange transaction processing, ticketing applications, and warehousing/distribution applications. For example, in the financial securities and exchange application domain, a single securities transaction may be distributed to other applications depending upon the particular security involved, the volumes of the transaction, the trading parties, the currencies involved, the clearing agents, or any combination of those fields and other parameters.

Prior designs generally utilized procedural specifications for the translation of the heterogeneous message formats. A specific "hard wired" procedure is generated for the translation of each of the plurality of message formats into each other message format. Addition of a new message format to be exchanged among the processes would require the generation of a new procedure for translation between the new format and each of the existing formats. As noted above, this process leads to exponential growth of complexity in maintaining such distributed applications.

The methods and structures of the present invention provide for flexible translation of messages without the exponential growth of custom procedural specifications for each new format added to the application. The present invention provides a semantic and syntax for describing the structure of any message in accordance with its data content and structure. Each message format known to the distributed application is described in the semantic and syntax of the present invention. Methods of the present invention then transform any received (input) message into any desired (output) message with reference to the descriptions of the two message formats. An input message is first parsed in accordance with the input message format specification. A K-tree data structure is used to represent the input message format. A field array (also referred to herein as field group array or FGA) is used to store information regarding input message instances parsed in accordance with their corresponding input message format K-tree structures. These data structures provide rapid access to data from the input messages and to retain structural information regarding the input message format. The specific structures and associated methods are presented below in additional detail. Other data structures and associated search methods may be employed as well to provide rapid retrieval of fields from the input message.

Reformatting Methods of the Present Invention

Figure 2:
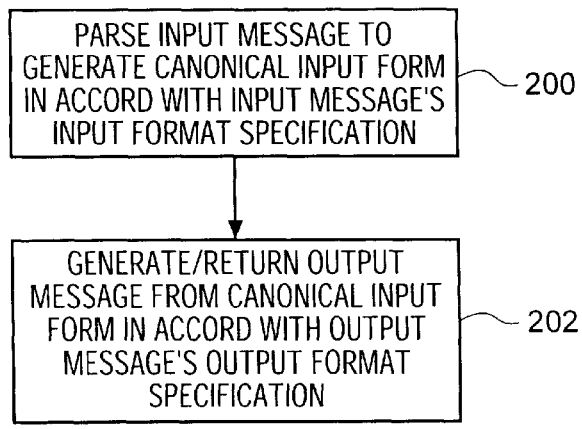
FIG. 2 is a flowchart describing the method of the present invention to reformat messages based solely upon descriptions of the messages content and format.

FIGS. 2–9 are flowcharts describing the methods of the present invention for reformatting an input message to generate a desired output message. FIG. 2 presents the method of the present invention in its broadest sense. Specifically, element 200 is operable to parse a supplied input message in accord with the input message format specification. Each message (input or output) is associated with a type code or identifier by the application performing the translation. Element 200 therefore locates the format description for the input message type and retrieves the format from a central repository.

A format description (either an input or output format description) describes a class of messages of which the supplied input message is a specific instance. Details of a preferred format description semantic and syntax are provided below. Element 200 is operable to parse the input message instance in accordance with the retrieved input message format description. The results of the parse are stored in a canonical form in a field array (FGA) data structure created and manipulated by the methods of the present invention. The FGA stores structural information relating to the actual message instance (e.g., particular instance identifications for repeating fields and hierarchical structure level information of the format description used to parse the message instance. The actual positional and length location of data parsed from the message instance is stored as a reference to the actual data in the FGA. Alternatively, the actual data may be duplicated and stored within the FGA data structure. The FGA, as discussed below, provides rapid access to the input data fields for mapping to the corresponding output message fields or for "random" access by the application to required fields.

Element 202 is then operable to return requested data fields in canonical form from the FGA or to generate a requested output message from the data stored in the FGA. An application may request individual data fields be returned from the input message in the canonical form in which they are stored within the FGA. This use of the methods of the present invention is applicable, for example, where in a publish/subscribe messaging subsystem a particular field (or set of fields) of a received message may be required to determine which processes (nodes) are subscribers to the message. This API interface may be used in numerous other applications wherein a parsed input message is analyzed for further processing.

In another form of invocation, element 202 generates an entire output message in accord with a specified output message format. As discussed below in additional detail, data in the FGA is retrieved in sequence and in accord with the requirements of the specified output message format. Each field of data to be generated in the output message is derived in accord with the output message format and may involve translation of a value from the input message as represented in the FGA (as noted below, output field format descriptions need not involve a translation of an input field but may, for example, be generated as a literal value). Details of this translation process are discussed below.

The general method described by FIG. 2 is therefore operable to re-format messages based solely upon a description of the content and structure of the messages. As compared to prior procedural techniques, the methods and structure of the present invention (as generally described by FIG. 2) is more flexible and more easily scaled for a large number of supported formats.

One skilled in the art will readily recognize a wide variety of equivalent methods and associated data structures to implement flexible, scaleable message re-formatting procedures which are based upon a content and structural description of the supported message formats. Many data structures permit rapid searching of data fields to map input data value to corresponding output data values. The following figures and associated discussion provide additional detail regard the best presently known mode of implementing the methods and structures of the present invention.

An input message is associated with an input message format specification (also referred to simply as input format). More specifically, the message is an instance of a class of messages described by the input format. The input format is predefined by a user of the distributed application. The input format describes the structure of an input message as a hierarchical tree whose nodes describe the structure of a particular fields of the input message. A flat field is one which describes a field of the input message in terms of atomic data types and attributes. A compound field is one which describes higher level structures in the input message which, in turn, are comprised of other compound fields and/or flat fields. This tree structure is preferably implemented as a K-tree data structure wherein each node (also referred to as knode) includes at least one field (either flat or compound). A knode may contain a plurality of fields corresponding to format descriptions at a particular hierarchical level of the K-tree. Each field may be either a flat field or a compound field.

The input format is therefore also referred to herein as the input format K-tree and the input message is an instance of actual data in accordance with the structure of the input format K-tree. The input format K-tree is used as a template to parse the input message tree, whose structure will be as defined by the input format K-tree. A field array (FGA) data structure is generated to represent the input message in a form that is rapidly searchable. The FGA retains the structural information to recognize the hierarchy of compound fields and repeating original input message. The actual data values for flat fields of the in may be referenced by the corresponding FGA entry or may be duplicate on the input message and contiguous with the FGA.

An output message is associated in an put message format specification (also referred to simply as output format). The output format is predefined by a user of the distributed application. The output format describes the structure of an output message as a hierarchical K-tree whose nodes describe the structure of particular fields of the output message. As with the InputFormat, each node may represent one or more fields in the output message and each field may be either a compound field of a flat field.

The output format is therefore also referred to herein as an output format K-tree and the output message is an instance of actual data in accordance with the structure of the output format K-tree. The output format K-tree is used as a template for generating the output message. The structure of the output message tree will generally be the same as the structure of the output format K-tree but the content and actual structure of the output message is driven by the content of the input message. In other words, the output format K-tree determines the overall structure of the output message, but the actual values and number of repeating fields in the output message is determined by the data in the FGA (representing the input message).

Figure 9:
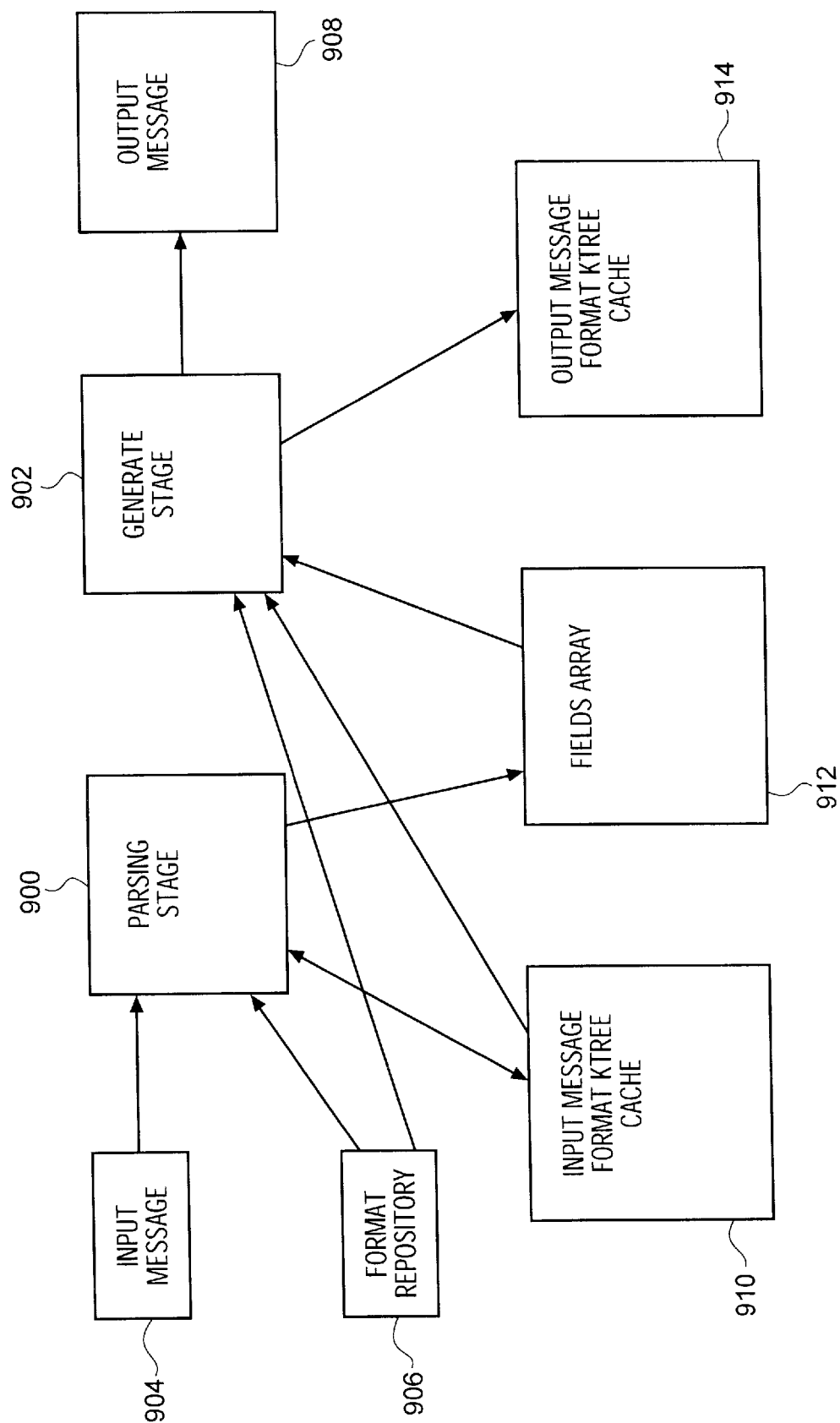
FIG. 9 is a block diagram describing the flow of data between a parsing stage and a generation stage of the methods of the present invention.

FIG. 9 is a block diagram describing the relationship and application of these data structures in association with the methods of the present invention. Input format cache 910 stores K-tree structures describing input message formats provided to the method by the invoking process. Likewise, output format cache 914 stores K-tree data structures describing output message formats provided to the method by the invoking process. Fields array 912 (FGA) is an intermediate structure used to represent supplied input messages in a format which is rapidly searched and which retains structural information describing the hierarchy and repetition within the original input messages.

Parsing stage 900 of the methods of the present invention (described in additional detail below) is supplied input messages 904 by the invoking process. Each input message 904 is associated (by a message type indicia not shown) with a format description. Format descriptions known to the methods of the present invention are stored in format repository (e.g., database) 906. For each supplied input message 904, parsing stage 900 retrieves the associated message format description from format repository 906 and builds a corresponding K-tree structure in input format cache 910. In addition, each input message instance supplied to parse stage 900 is represented in FGA entries built by parsing stage 900 in FGA 912. The K-tree structure represents the hierarchical structure of a class of messages of which input message 904 is an instance. The FGA 912 entries (in combination with the structural information of the K-tree) represent a specific instance of such a message class with specific data values and specific a sequence of repetitions, hierarchy, conditional values, etc.

The generate stage 902 of the methods of the present invention receives a request to generate a specific type of output message 908 from the invoking process. In response, the generate stage 902 locates the format type in the format repository 906 and constructs an equivalent K-tree description of the format in output format cache 914. The generate stage then generates requested output fields from the output K-tree structure by mapping (deriving, calculating, etc.) from appropriate input fields described by the combination of the input format cache 910 content and the FGA 912 content. When all requested fields of the output format K-tree have been generated, the resultant output message is returned to the invoking process.

As noted above, the methods of the present invention may be invoked to retrieve a particular data value in canonical form from the FGA 912 rather than generating an entire output message 908. This may be viewed essentially as a special case of processing by the generate stage 902. The generate stage may request a specific field value from the input message as represented in the FGA 912 and return the value to the invoking process without requiring a complete output format description.

One skilled in the art will recognize that the form for representing a format description in format repository 906 and in either input format cache 910 or output format cache 914 need not necessarily be different. A first form for representing a format in format repository 906 may be most useful for a user interface which allows the user to define or modify format descriptions. The K-tree structure representing a message format and stored in input format cache 910 or output format cache 914 is an equivalent representation of the format description in the format repository 906. The K-tree form of format description is more useful for subsequent processing of the parsing stage 900 and the generate stage 902 which require rapid access to the content and structure messages and associated structure.

Figure 3:
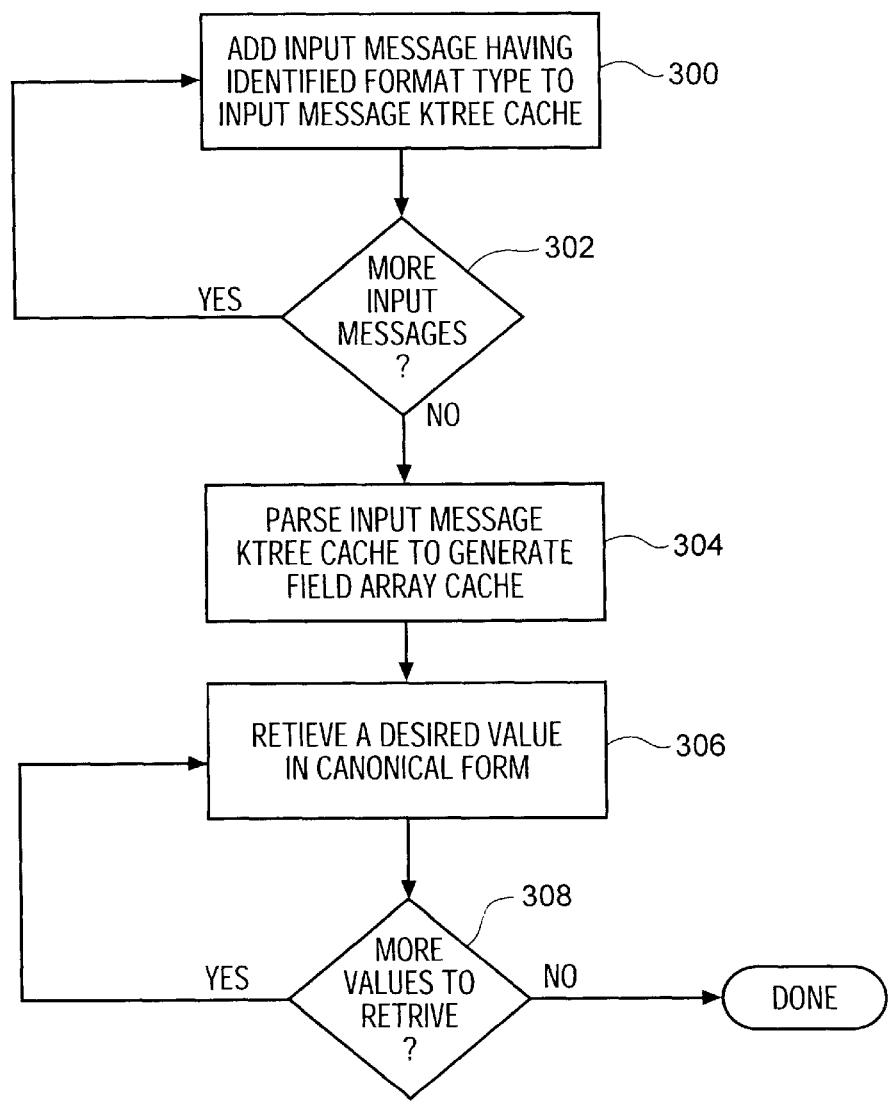
FIG. 3 is a flowchart describing a preferred method for parsing messages in accordance with the present invention to return data in a canonical format.

FIG. 3 describes the parse mode of operation of the methods of the present invention wherein a specific value may be retrieved from a messaged parsed into canonical form in the FGA 912 of FIG. 9. Element 300 is operable to add a K-tree structure to the input format cache. The K-tree to be added by operation of element 300 corresponds to the format description of the input message type supplied by the invoking process. The format type is located in the format repository 906 (of FIG. 9) and a corresponding K-tree is constructed in the input format cache 910. Element 302 is then operable to repeat operation of element 300 until no further input formats are provided by the invoking process.

Element 304 is next operable to parse the input messages provided and the under control of the associated K-trees to generate entries in the field array 912 of FIG. 9. As noted above, the field array contains entries describing the location of actual data values instantiated in the input messages provided by the invoking process. Creation of the FGA 912 is discussed in additional detail below.

Element 306 is then operable to locate a specific data value in the FGA 912 in accordance with the request of the invoking process. The invoking process requests the actual data value using the field ID (or field name) assigned to the canonical data type (the atomic data type). The value corresponding to the requested field ID or name is then returned to the invoking process. Element 308 repeats the operation of element 306 until the invoking process request no further data values.

Figure 4:
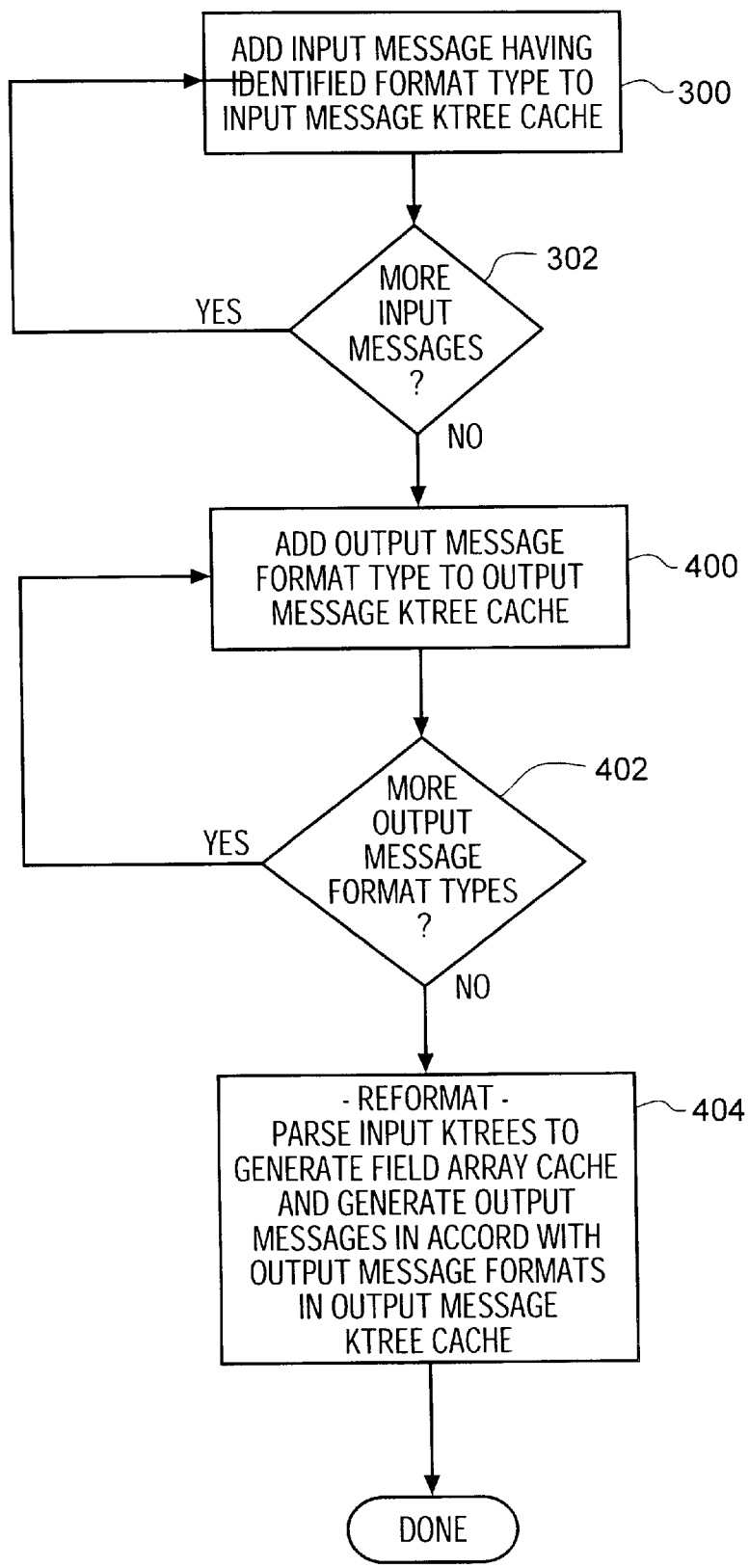
FIG. 4 is a flowchart describing a preferred method for reformatting input messages into output messages in accord with the present invention.

FIG. 4 describes the reformat mode of operation of the methods of the present invention wherein a specific output message is generated based upon the actual data and structure of the provided input messages provided by the invoking process and parsed to generate the FGA 912 content. Elements 300 and 302 of FIG. 4 are operable as above with respect to FIG. 3. Specifically, element 300 is operable to add a K-tree structure to the input format cache and element 302 is then operable to repeat operation of element 300 until no further input formats are provided by the invoking process.

Elements 400 and 402 are operable to retrieve requested output message format descriptions from the format repository 906 of FIG. 9 and to generate (create, build, construct, etc.) an equivalent K-tree in the output format cache 914 of FIG. 9. Output messages for which the invoking process requests generation are described in similar style to that of the input format descriptions.

Element 404 is then operable to parse all input messages received from the invoking process in accord with the corresponding K-tree in the input format cache 910 to thereby generate entries in the FGA 912. In addition, element 404 then is operable to process each K-tree in the output format cache 914 in accord with the input format cache 910 structure and FGA 912 data to generate requested output messages.

One skilled in the art will recognize that a plurality of input messages 904 may be used to create any particular output message 908 and likewise, a plurality of output messages 908 may be generated from one or more input messages 904. The format descriptions of output messages 908 may map input data from any of one or more input messages provided to generate (derive) a particular value in an output message 908.

K-Tree Traversal

Figure 5:
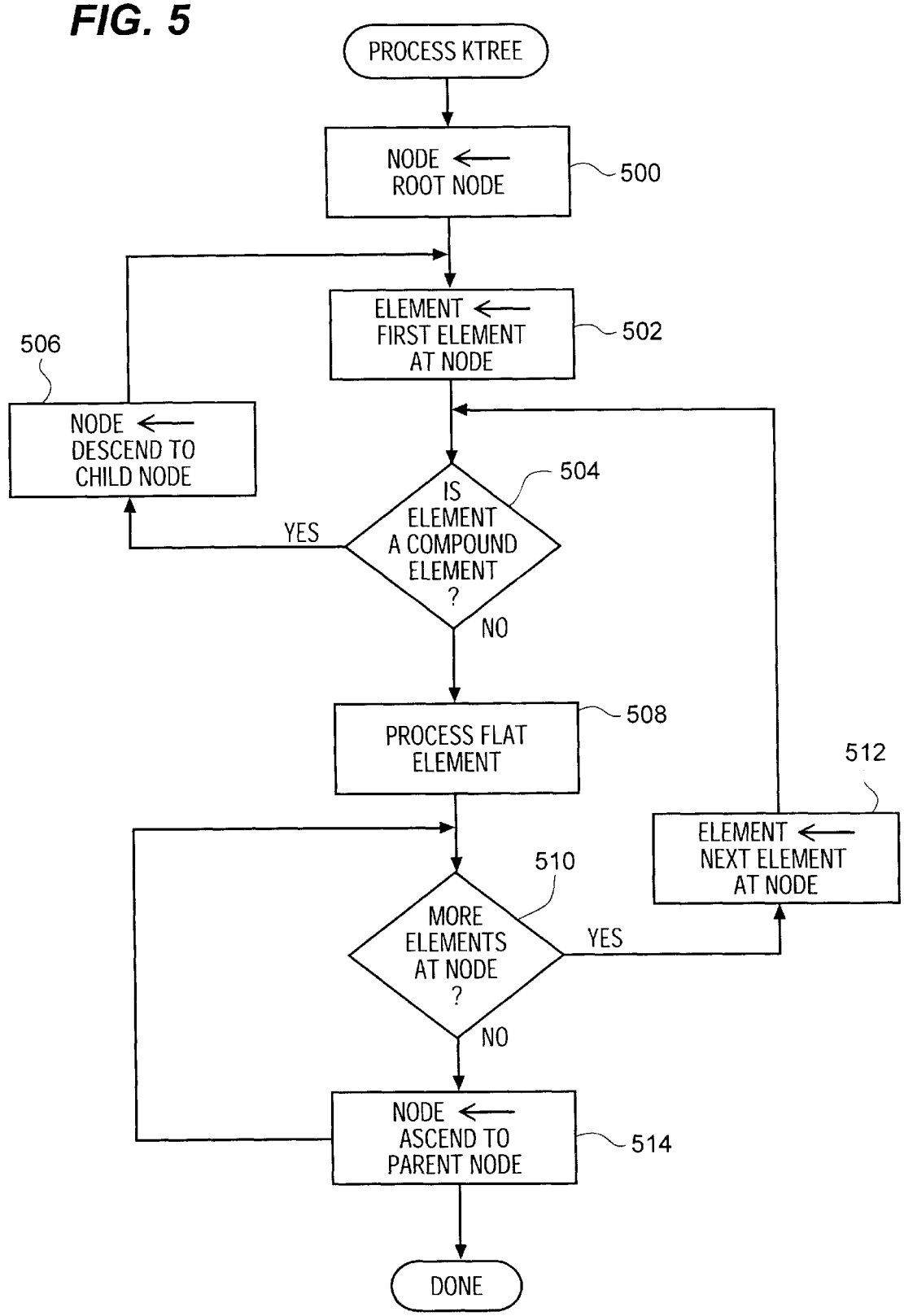
FIG. 5 is a flowchart describing a traversal method for a K-tree data structure useful in a preferred embodiment of the present invention.

Bates (supra.) provides a detailed description of the general structure and control methods of K-tree data structures. The processing outlined above with respect to elements 304 and 404 is directed by traversing the K-tree data structures in the input format cache 910 and the output format cache 914. FIG. 5 therefore outlines the processing methods for traversal of an abstract K-tree data structure.

A K-tree data structure, as used herein, may be simply defined as a hierarchically organized collection of nodes wherein each node is a collection of one or more elements and where each element may be either a compound element or a flat element. A compound element contains a reference to another node (e.g., a pointer). A flat element contains substantive information relevant to the K-tree application. For example, in an input or output format K-tree, each flat element defines the format of a particular field in the input or output message (including repeating fields). A compound field "points" to a subtree of other elements and therefore is a logical entity which is comprised of other lower level nodes defining other elements of the K-tree.

Element 500 begins the traversal of a K-tree by setting the local variable NODE to "point" at the root of the K-tree to be traversed. Element 502 begins processing of the node pointed to by NODE by setting the local variable ELEMENT to the first element of the node pointed to by NODE. Element 504 is then operable to determine whether ELEMENT is a flat or compound type of element. If flat, processing continue with element 508. If compound, element 506 is next operable to descend to the child node pointed to by the compound element at ELEMENT in NODE. Specifically, element 506 recursively invokes the processing of FIG. 5 (starting at element 502) to descend the K-tree from the parent node to the child node. Element 506 sets the local variable NODE to the child node pointed to by ELEMENT at the current NODE. Processing then recursively re-enters FIG. 5 at element 502 to begin processing the new subtree portion.

If the ELEMENT was determined to be a flat element by operation of element 504, element 508 is operable to perform the appropriate processing for the flat element. Specifically, a flat element in an input format K-tree is an input format control and a flat element in an output format K-tree is an output format control. Such flat elements in the present context are processed by "executing" the format control. As discussed below, executing an input format control generates entries in the FGA 912 of FIG. 9. Further, as discussed below, execution of an output format control retrieves (maps) input values from the input messages represented by the FGA 912 and the input format cache 910 of FIG. 9 into corresponding data values in the output message to be generated.

Element 510 is next operable to determine if there are more elements to be processed at the node pointed to by NODE. If more elements remain to be processed at the present NODE, element 512 is next operable to set the ELEMENT variable to the next element in the node pointed to by NODE. Processing then continues by looping back to element 504 to process the next ELEMENT.

If element 510 determines that no further elements remain to be processed at the present NODE, element 514 is operable to ascend the K-tree to the parent node (if any). If any node processed at element 504 was determined to be a compound element, then this processing at element 514 performs the return from the recursive processing invoked at element 506 above. The processing of the method then resumes at element 510 in the previous (parent) node. Element 510, as above, then determines if further elements remain to be processed at the now current NODE (the parent node which previously caused the descent to a child node. If the present node is the root node of the K-tree, element 514 simply completes processing of the method (as indicated by the second path out of element 514 to completion).

One of ordinary skill will readily recognize a variety of methods for traversal of the K-tree in this or a similar order.

As noted above, Bates (supra.) discloses detailed methods and data structures useful for implementing a K-tree structure and for traversing same.

Figure 6:
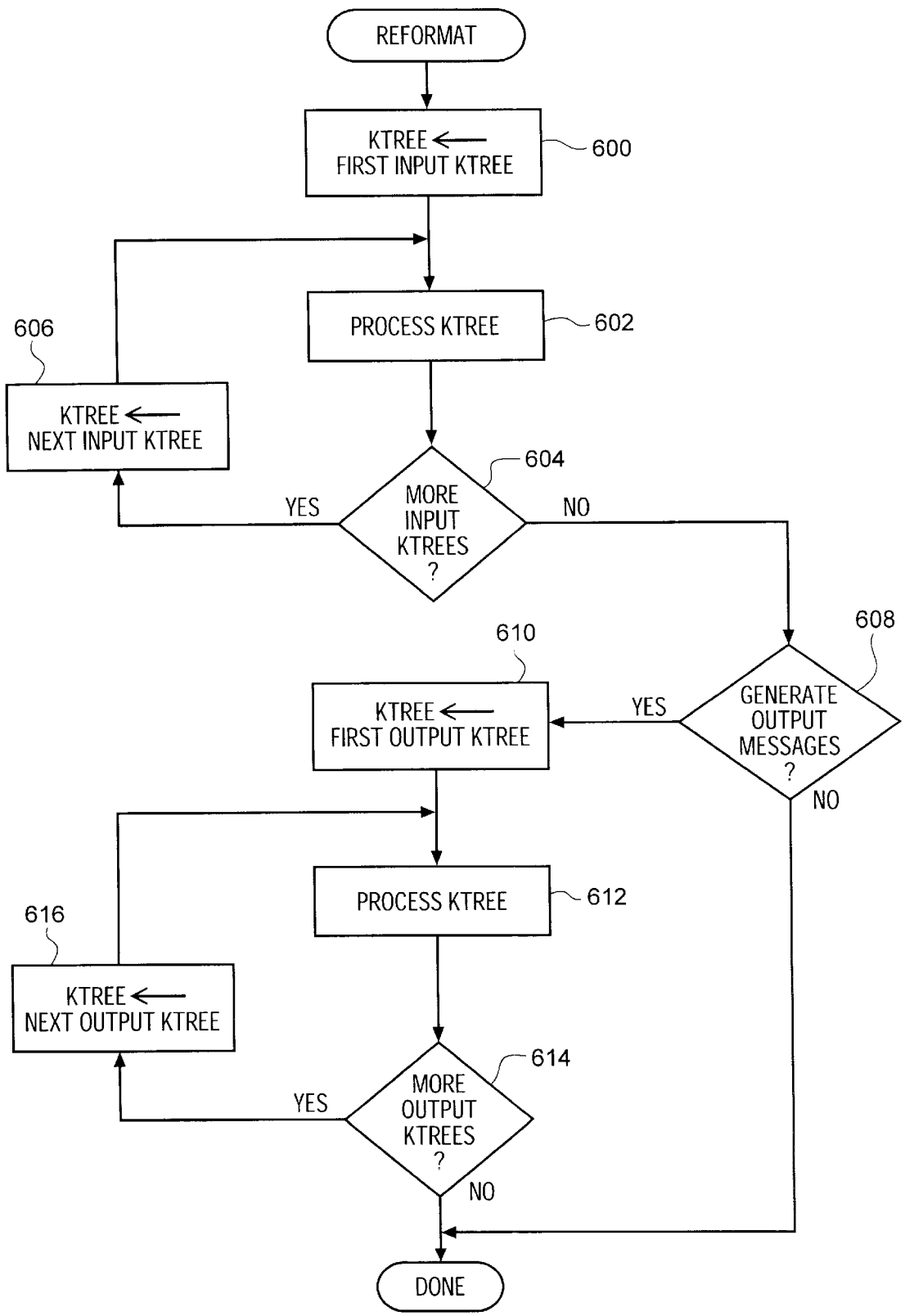
FIG. 6 is a flowchart describing the method of FIG. 4 in additional detail using the K-tree methods of FIG. 5.

In view of the K-tree processing method of FIG. 5, processing of element 902 of FIG. 9 (as well as element 404 of FIG. 4) to reformat input messages to generate output messages therefrom may be understood in additional detail with respect to FIG. 6. Element 600 sets local variable KTREE to "point" to the first input K-tree in the input format cache 910 of FIG. 9. Element 602 then processes the K-tree pointed to by KTREE as described above with respect to FIG. 5. The processing of a flat element in the traversal of the input K-tree (a flat input control) generates appropriate entries in the FGA 912 ofif other id is discussed in detail below. Element 604 then determines if other input K-trees remain to be so processed in the input format cache 910. If further input K-trees remain to be processed, element 606 is operable to set the variable KTREE to point to the next input K-tree in the input format cache 910 of FIG. 9 and processing then continues by looping back to element 602. If no further input K-trees remain to be processed, processing continues with element 608.

As noted above, the methods of the present invention may be invoked to simply parse the input messages (process the input K-trees and thereby generate the canonical data formats in the FGA 912) or to fully parse the input messages and generate requested output messages therefrom. If the methods are invoked to merely parse the input messages, element 608 so determines and processing is completed. Subsequent API invocations of the methods of the present invention may request particular fields of data be retrieved and returned in canonical form from in accord with the input format cache 910 and FGA 912. If element 608 determines that output messages are to be generated, processing continues with element 610.

Elements 610–616 are operable to process output format K-trees in the output format cache 914 Of FIG. 9. Elements 610-616 iteratively process output format K-trees in a manner similar to elements 600-606 processing of input format K-trees. Element 610 initializes the variable KTREE to reference the first output format K-tree loaded (constructed) in the output format cache 914 of FIG. 9. Element 612 then processes the output format K-tree pointed to by KTREE as described above with respect to FIG. 5. The processing of a flat element in the traversal of the output K-tree (a flat output control) generates data for the output message 908 by deriving a value in accord with the flat output control and in accord with any required input field values required by the format specification. Details of the operation of element 612 are presented below. Element 614 then determines if other output K-trees remain to be so processed in the output format cache 914. If further output K-trees remain to be processed, element 616 is operable to set the variable KTREE to point to the next input K-tree in the output format cache 914 of FIG. 9 and processing then continues by looping back to element 612. If no further output K-trees remain to be processed, processing of the requested reformat operations is complete and requested output messages have been generated.

FGA Contents and Access

The field array (FGA 912 of FIG. 9) is a two dimensional array of fields and provides an interface between the input format K-trees in input format cache 910 (created by the parse stage 900 of FIG. 9) and output format K-trees in output format cache 914 (created by the generator stage 902 of FIG. 9). The format K-trees themselves never contain actual input or output message data. Rather, they contain only descriptive configuration and structural information regarding a message format. The FGA 912 contains the actual data (or preferably pointer information to locate the actual data in the associated message). The FGA 912 is therefore the source of data when using the output message K-tree in the generate stage to generate the output message.

Each field instance within the intermediate array is chained with other fields of the same field type (as indicated by the field ID value). Patient-first-name, for example, is a field that may occur repeatedly within a repeating record. Each instance of patient-first-name in an input message would therefore have corresponding information about the particular instance in the field array. This information includes, for example, the starting position (offset) and the length of the data in the corresponding message. The collection all such elements of a single field type within in the FGA 912 will be referred to herein as a field column. A field header is associated with each field column within the FGA 912 and contains the common field ID value (which defines the field column) and K-tree pointer information to relate the fields of the field column to structural elements in the input format K-tree.

The FGA 912 object provides a control interface for retrieving the next logical instance of a field by its field ID value (or equivalently by its field name). The field name or field ID value is associated with the field column (with all instances in the field column), and not to a particular field in the instance of a message. The FGA 912 control interface therefore enable the invoking process to request the next instance of a field and to retrieve that field in the sequence order in which the field instances appeared in the input message. For example, any two input messages may be created on translation (in the parse stage 900), both of which may contain fields called patient-first-name which may use the same data instance in each message. The field access mechanism within the FGA 912 shields the generate stage 902 from knowing the structure of the input message and provides a generic mechanism for retrieving the next instance of a field. An offset value in the header of the field column is incremented each time a particular field instance is accessed in sequence.

The header for each field column contains a pointer to its peers via a pointer into the input format K-tree. Thus, the input format K-tree contains structure and the peer pointer is used to access a peer instance when an offset increment occurs by virtue of a request to retrieve the next instance of a field. The header for each field column also contains a pointer to its parent via a pointer into the input format K-tree. Thus the input format K-tree contains structure and the peer pointer is used to access a parent instance when an offset increment results in a sequence break occurs.

The nodes of a K-tree (knodes) also contain related offset and sequence values to coordinate navigation through input message records as the process retrieving data values from the FGA 912 sequences through fields from a plurality of records. The offset and sequence values in the field headers of field columns in the FGA and the corresponding sequence and offset values in the knodes of the input message format K-trees control the sequencing of data values returned to the invoking process as each field is requested and retrieved. The sequence in which the generate stage (e.g., the invoking process) retrieves data values from FGA is determined by the sequence and structure of the output message being generated (as represented by the output format K-trees).

Each instance of a field in a row (input message) within a repeating row type, for instance a record that repeats with the same fields, is an offset instance having an offset value starting with one. Thus, each access within a format level is based upon offset. Offset is determined within the FGA 912 itself at the field header for each field column instance. In the case where an access is the first instance of access to a field, the offset is set to one from zero (zero indicating that the field has not been previously accessed). In the case where an access is a follow-on access (e.g., offset value is non-zero), the offset is incremented and the nodal pointer within the input format K-tree is checked to insure that all instances of knodes within the current offset are the same.

In the first instance where this is the case, offsets within peer nodes are set to the new offset and an indicator is set to show that an increment occurred externally to the new offset. Any time a field is accessed and the offset indicator is modified to a value that the input parse tree for the format containing the field must be incremented results in an increment of the peers. This maps when the field request should logically result in the requester being taken to the next row.

Key to the operation of the FGA 912 control interface is the concept of a sequence break. In the case of the last offset within a sequence being reached, a sequence break occurs. Each field within a set of common rows is said to be within the same sequence. Each sequence within an input message may be separated by one or more intermediate data rows that may contain additional recursive levels or may simply delineate the separation between a set of similar rows. The operational rule is that whenever a sequence break occurs, this requires the parent pointer to be used to access the parent knode and increment the offset value at that parent knode. Since the parent node may have peers and parents as well, the offset increment could result in a sequence break that goes to the next higher level and increments that offset as well. This pattern repeats in the instance of a deeply recursive message whose data is retrieved in its entirety by the output generator via the FGA 912 control interface.

Figure 7:
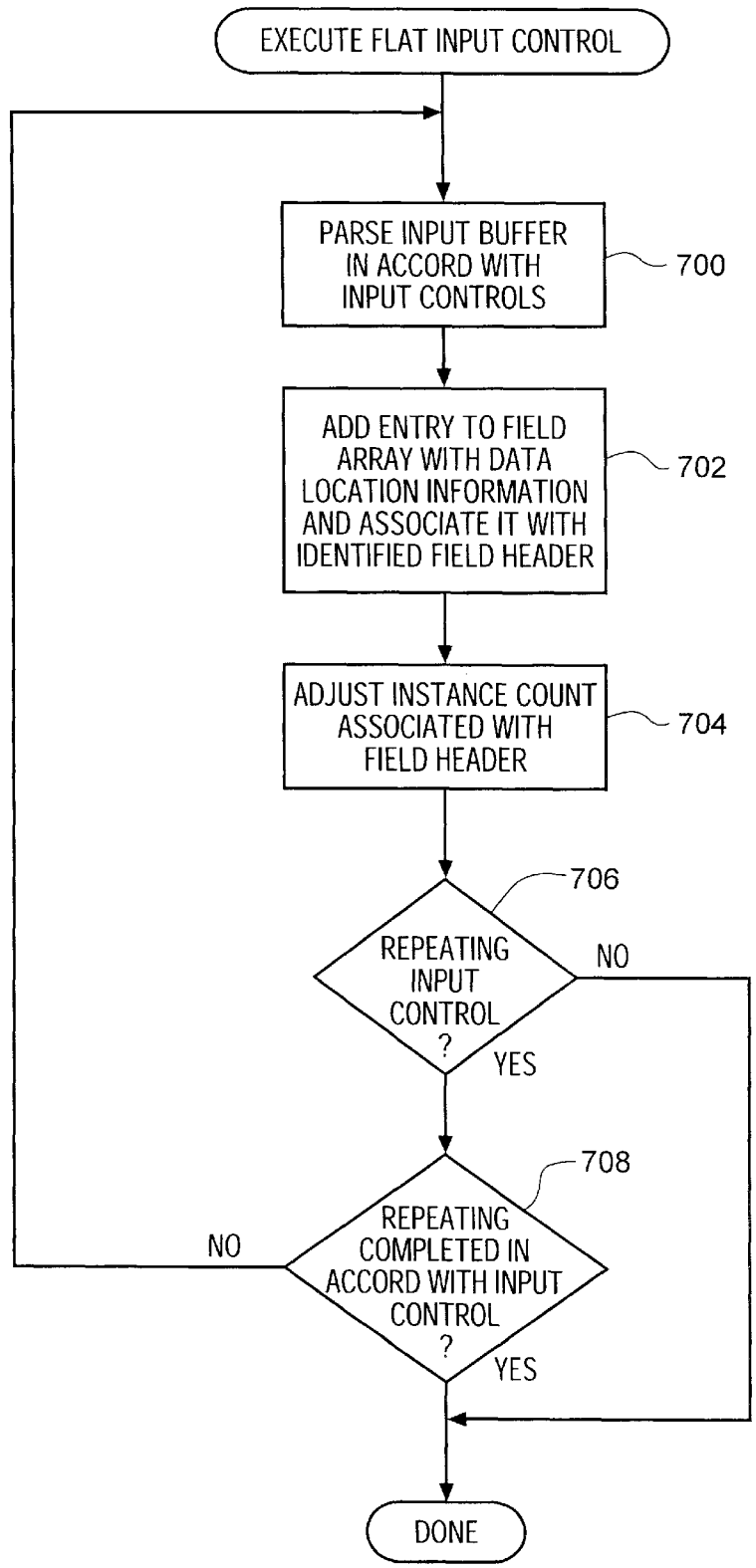
FIG. 7 is a flowchart describing a preferred method for executing flat input controls encountered in traversing an input K-tree in accordance with FIG. 6.

FIG. 7 is a flowchart describing the detailed operation of creating entries in the FGA 912 by execution of flat input controls. As discussed above, when a flat input control is encountered in traversing an input format K-tree (e.g., the parse stage traversal of an input format K-tree to parse an input message), the flat input control is "executed" (e.g., by operation of element 508 of FIG. 5). The execution of a flat input control parses the input message in accord with the format specification of the input control (e.g., locate the data field given the data type, attributes, and conditions defined by the input control format specification). Having so located an input data value, an appropriate entry is added to the FGA 912 to reflect the position of the located data and to associate the data with the structural elements of the input message K-tree.

Element 700 is first operable to parse the input message in accord with the input control format specification. Element 702 is then operable to add an entry to the FGA 912 which locates the data value in the input message and associates the data with a knode of the input format K-tree corresponding to the input message structure. If this instance of a data value is the first instance encountered for the field ID (or name) associated with the input control, then element 702 creates the field header (thereby creating the field column) and links this data value instance to the new field column's field header. If this instance is not the first, the new instance is simply added to the field column corresponding to the field ID (or name) associated with this input control.

Element 704 is then operable to adjust various counter values associated with the field header for the field column. The number of instances so located is, in part, determinate of the sequence of data instances returned later when retrieving input data instances to an invoking process (e.g., to map input fields to output fields for generation of an output message).

Element 706 determines whether the input control is a repeating control. If not processing of the flat, non-repeating input control is completed by the update of the FGA 912. If the flat field is repeating, element 708 is next operable to determine if the repetition is complete in accord with the input control format specification (e.g., has the repetition delimiting condition been encountered). If the repetition is complete, processing of the flat, repeating input control is complete. Otherwise, processing continues by looping back to element 700 to locate additional repetitions of data values in the input message.

Figure 8A:
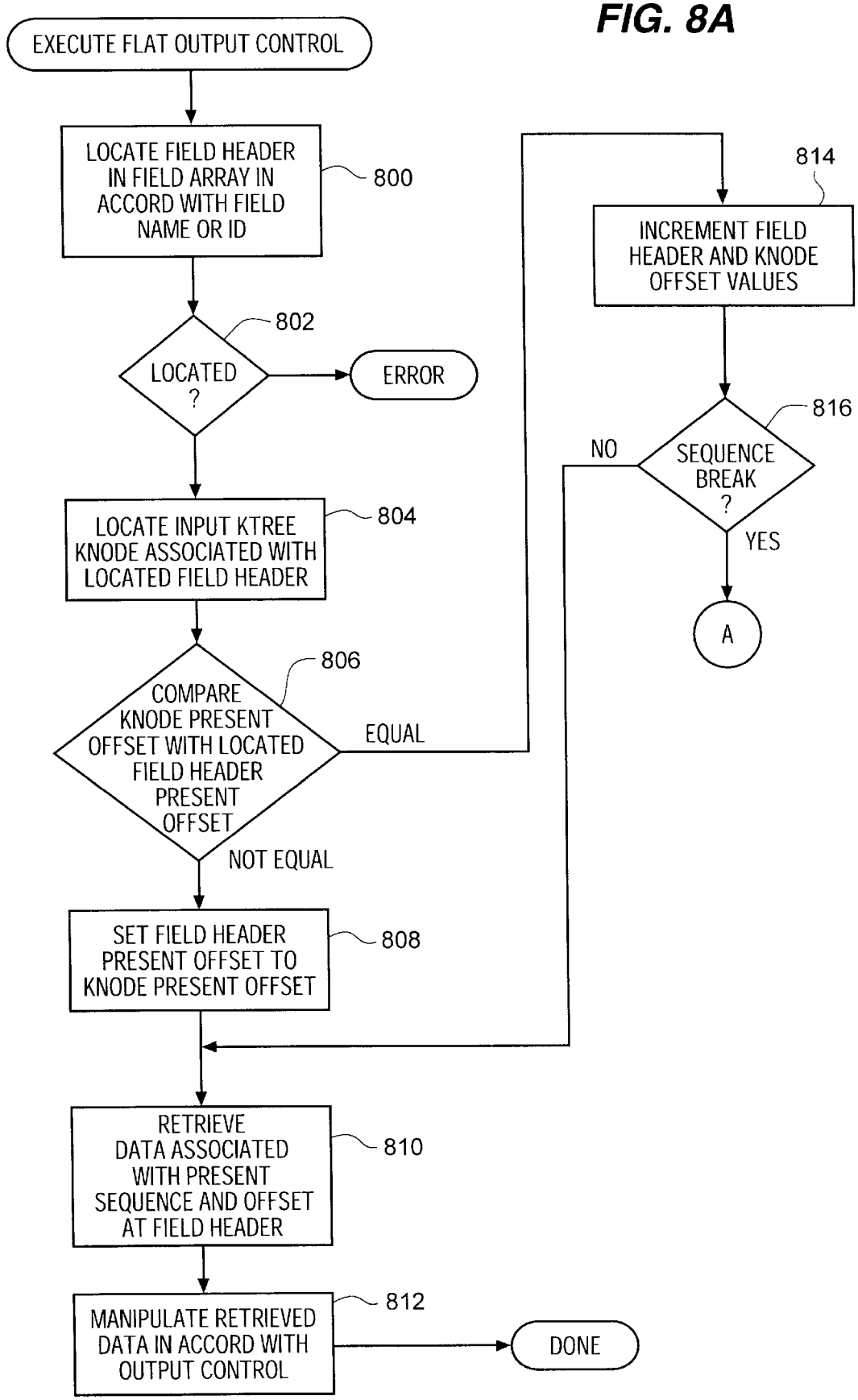
FIGS. 8a and 8b, in combination, is a flowchart describing a preferred method for executing flat output controls encountered in traversing an output K-tree in accordance with FIG. 6.
Figure 8B:
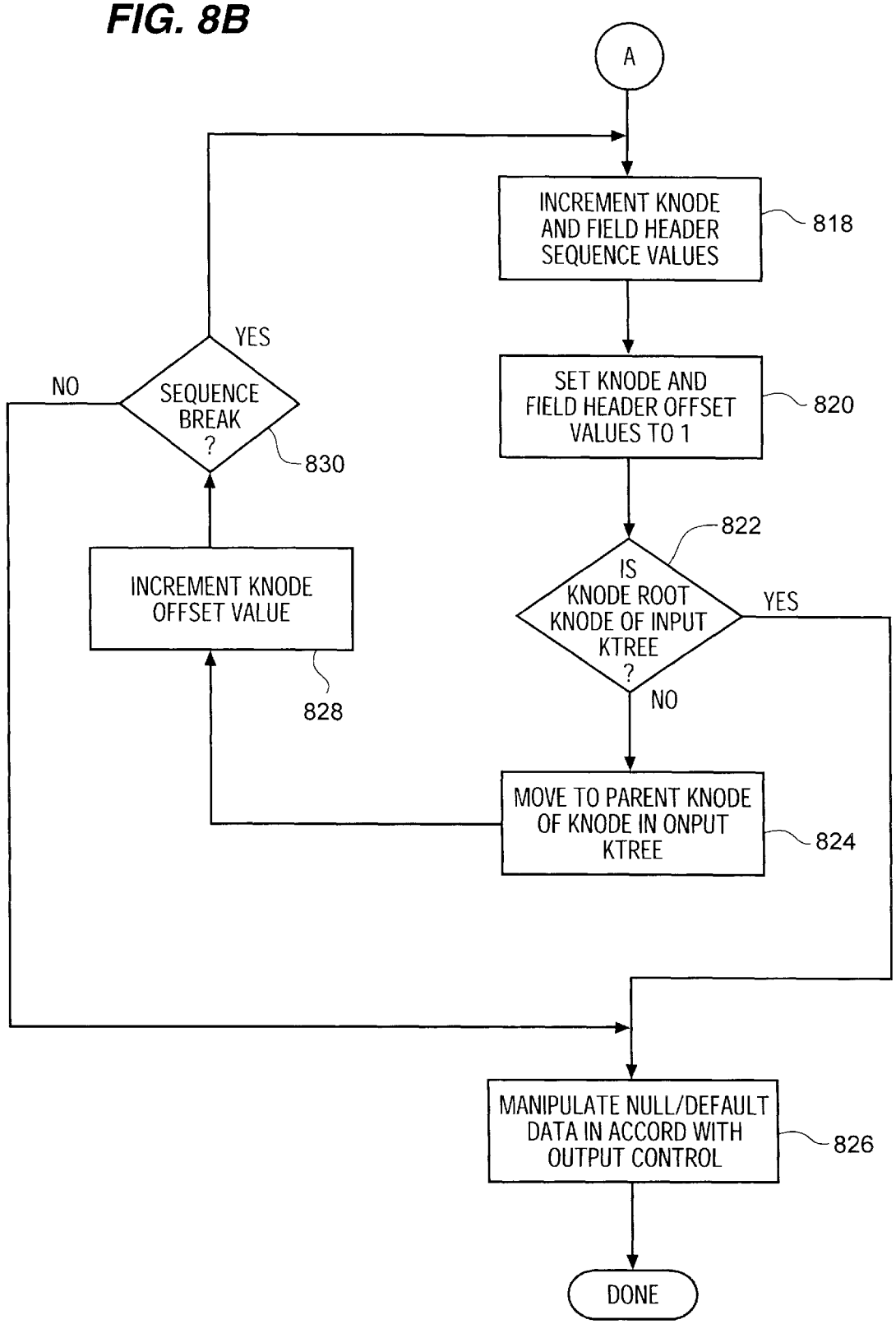

FIGS. 8a and 8b, in combination, is a flowchart describing the detailed operation of generating output messages by execution of flat output controls. As discussed above, when a flat output control is encountered in traversing an output format K-tree (e.g., the generate stage traversal of an output format K-tree to generate an output message), the flat output control is "executed" (e.g., by operation of element 508 of FIG. 5). The execution of a flat output control retrieves (maps) required data from the input messages (as represented in the FGA 912) and manipulates the retrieved data as specified by the output control (e.g., translates, computes, conditional processes, or otherwise derives the desired output value). As noted above, the entries in the FGA 912 and the input format K-trees control the sequence of data retrieved by the output message generation process.

Element 800 locates in the FGA 912 the field column corresponding to the field ID (or name) associated with the output control. If element 902 determines that no such field ID is available in the FGA 912, processing of the output control is complete with an error condition. Default data or other values may be substituted for the missing value in accord with the format specifications of the output control. If the field column is successfully located, processing continues with element 804.

Element 804 uses the pointers in the field column header to locate the knode of the input format K-tree which corresponds to the located field column header. Element 806 then compares the present offset values in the located knode with those in the located field header of the field column. If the values are not equal, the field column has not been accessed in sequence (while other fields of the same rows have been accessed in sequence). The offset value of the field header is therefore set equal to the offset value of the knode by operation of element 808. Element 810 then retrieves the data value from the input message located by the position information stored in the field instance of the field column at the newly updated offset and sequence values of the field header. Element 812 then manipulates the retrieved data in accord with the format specifications of the output control. The manipulated data is appended to the output message under construction to complete processing of this output control.

If element 806 determines that the offset values in the located knode and the located field header are equal, element 814 is then operable to increment both offset values to indicate another data value instance being retrieved in sequence. Element 816 then determines if the newly incremented offset values exceed the numbed of repeating values available in the input message. If not, processing continues with elements 810 and 812 as above to retrieve the next data value in sequence from the input message.

If element 816 determines that the newly incremented offset values exceed the number of repeating data value instances of the field column, the a sequence break condition arises and processing continues with element 818 at label "A" of FIG. 8*b*. Element 818 increments the sequence values in both the located knode and the located field header of the field column. Element 820 then resets the offset values in the field header and knode to one so as to cause the next received request to access the first data value instance of the next row (record) of the input messages. Element 822 then determines whether the knode (the located knode) is the root knode of the input format K-tree. If it is, processing continues with element 826 to manipulate a null or default data value in place of the unavailable data (indicative of a sequence break).

If element 822 determines that the present knode is not the root knode of the input format K-tree, processing continues with element 824 to follow the links to the parent knode. Processing then continues with element 828 to increments the parent knode's offset value and element 830 to determine if the newly incremented offset at the parent knode generates yet another sequence break at the parent knode hierarchical level of the input format K-tree. If not, processing completes with element 826 as above. If the parent knode offset increment generated another sequence break, processing continues by looping back to element 818 to repeat the sequence break processing of elements 818–822 for the parent knode. The processing of elements 818–830 repeats until the K-tree level reaches the root of the K-tree or until an offset increment does not generate another sequence break condition.

As noted elsewhere herein, the K-tree structure and processing methods described above are representative of the best presently known mode for processing hierarchical input and output message formats to permit rapid access to the format specifications, rapid access to the parsed input data, and to retain required information regarding the hierarchical structure of the original input message(s). One skilled in the art may recognize other structures and methods which achieve similar goal and provide the requisite performance and flexibility. The present invention is therefore intended to cover all such methods for translating input messages into output messages with reference solely to format descriptions of each message.

Formatter Database

Defined format specifications are preferably stored in a database (format repository 906 of FIG. 9) for ease of access and updates. The following tables provide a summary of a preferred embodiment of the format repository database tables. As noted elsewhere, one skilled in the art will recognize that message format specifications may be stored in many equivalent forms, including storage in the ultimate K-tree structures used to generate canonical input data formats and to generate output messages. The database definitions provided hereinbelow are representative of the best presently known mode of storing the format specifications to provide flexible access and ease of maintenance.

Table and Individual Field Descriptions

Table: Format

Main repository for input, output, flat and compound formats.

| Name | Description |
| --- | --- |
| FORMAT_ID | Unique format identifier |
| FORMAT_NAME | Unique format name |
| PROTOCOL_ID | Initially used to group formats. 3.0 only supports 1 protocol. |
| VERSION_ID | Initially used to group formats. 3.0 only supports 1 protocol. |
| INPUT_IND | 1-> input format<br>0-> output format |
| COMPOUND_IND | > 1 -> compound format<br>0-> flat format |

Table: compound_format

Compound format component table. Components of the format including and limited to other formats.

| Name | Description |
| --- | --- |
| FORMAT_ID | Unique format identifier |
| SEQUENCE_NO | Sequence of the component format within the compound format. |
| COMPONENT_FORMAT_ID | Individual component format identifier |
| OPTIONAL_IND | Optional format indication (within the compound format)<br>0-> Mandatory<br>1-> Optional |
| REPEAT_IND | Repeating format indication (within the compound format)<br>0-> not repeating<br>1-> repeating |
| REPEAT_TERMINATION_ID | If repeat termination type this is the type of usage. (repeat termination code from code table). Types are white space, minimum length plus white space, delimiter, exact count, field holds count, etc. |
| REPEAT_DELIMITER_ID | If repeat termination type is delimiter this holds the id for the delimiter. |
| REPEAT_COUNT | If repeat termination is exact count, stores the count. If repeat termination is exact length, stores the length. |
| REPEAT_FIELD_ID | If repeat termination is field holds count this holds the field for the exact count. |

Table: field

| Name | Description |
| --- | --- |
| FIELD_ID | Unique field identifier |
| FIELD_NAME | Unique field name |
| PROTOCOL_ID | Initially used to group formats. 3.0 only supports 1 protocol. |
| NOTE | Comment storage for field. |

Table: flat_format

Secondary repository for flat input and output formats (the first repository being the format table). Holds additional information related to flat formats.

| Name | Description |
| --- | --- |
| FORMAT_ID | Unique format identifier |
| DECOMPOSITION_ID | |
| MESSAGE_LENGTH | Length of message for this format if termination type is exact length. |
| TERMINATION_ID | If the termination type is white space, minimum length plus white space, delimiter, exact count, field holds count, etc., this is the termination identifier. |
| DELIMITER_ID | If the termination type is delimiter this is the delimiter identifier |

Table: input_format_field

| Name | Description |
| --- | --- |
| FORMAT_ID | Unique flat format identifier |
| SEQUENCE_NO | Sequence of the field in the input flat format |
| FIELD_ID | Identifier of the field in the input flat format |
| INPUT_PARSE_CONTROL_ID | Identifier of the parse control for the field |

Table: input_parse_control

| Name | Description |
| --- | --- |
| INPUT_PARSE_CONTROL_ID | Identifier of the parse control for the field |
| CONTROL_NAME | Unique name of the input parse control |
| OPTIONAL_IND | Optional indication for the parse control<br>0-> Mandatory<br>1-> Optional |
| FIELD_TYPE_ID | Field type (ASCII, Literal, etc.) |
| DATA_TYPE_ID | Data type (ASCII String, ASCII Numeric, etc.) |
| DATA_LENGTH | Length of the data part of the message field for this type. |
| DATA_TERMINATION_ID | Termination type identifier of the data part of the field. |
| DATA_DELIMITER_ID | If data termination is delimited this is the delimiter identifier. |
| TAG_VALUE | Holds ASCII string to match against the tag part of the field, if the field type is tag, length and delimiter. |
| TAG_TYPE_ID | Tag type (ASCII String, ASCII Numeric, etc.) |
| TAG_LENGTH | Length of the data of the tag part of the field for this type |
| TAG_TERMINATION_ID | Termination identifier of the tag |
| TAG_DELIMITER_ID | Delimiter id for the tag |
| LENGTH_LOCATION_ID | Where in the field the length part resides. |
| LENGTH_TYPE_ID | Length type (ASCII String, ASCII Numeric, etc.) |
| LENGTH_TERMINATION_ID | Length type identifier of the length part of the field. |
| LENGTH_DELIMITER_ID | If length type id is delimited, then this is the length identifier. |
| LENGTH_LENGTH | Length of the data of the length part of the field for this type |

| Name | Description |
| --- | --- |
| DECIMAL_LOCATION | If type is IBM Packed Decimal is the location of decimal. |

| Name | Description |
| --- | --- |
| DELIMITER_ID | Unique delimiter identifier |
| DELIMITER_NAME | Unique delimiter name |
| DELIMITER_LENGTH | Delimiter length |
| DELIMITER_VALUE | Delimiter value |

Table: delimiter

Repository for delimiter data (name, length and value)

| Name | Description |
| --- | --- |
| DELIMITER_ID | Unique delimiter identifier |
| DELIMITER_NAME | Unique delimiter name |
| DELIMITER_LENGTH | Delimiter length |
| DELIMITER_VALUE | Delimiter value |

Table: output_format_field

Repository for fields that are components of output flat formats.

| Name | Description |
| --- | --- |
| FORMAT_ID | Unique format identifier |
| SEQUENCE_NO | Sequence of the field in the output flat format |
| FIELD_ID | Field id contained in the output flat format |
| OUTPUT_FORMAT_CONTROL_ID | Output flat format control identifier |
| ACCESS_MODE | Access mode type (Normal access, etc.) |
| SUBSCRIPT | ? |
| IN_FIELD_ID | Input field id associated with the output field in input to output field mapping. |

Table: output_format_substitute

Repository for output format control substitution.

| Name | Description |
|---|---|
| OUTPUT_FORMAT_SUBSTITUTE_ID | Uniquely defines an output format substitute entry. |
| OUTPUT_FORMAT_CONTROL_ID | Id of the output format control to which the substitute control. |
| INPUT_DATA_LENGTH | Length of the data being substituted. |
| INPUT_DATA_VALUE | Value of the data being substituted (binary representation). |
| OUTPUT_DATA_TYPE | Output data type (ASCII, Numeric, etc.) |
| OUTPUT_DATA_LENGTH | Output data length after substitution |
| OUTPUT_DATA_VALUE | Value to be output during substitution. |

Table: output_format_control

Repository for input parse control information, (name, data type, tag type, prefix, suffix, padding).

| Name | Description |
|---|---|
| OUTPUT_FORMAT_CONTROL_ID | Unique output format control identifier |
| CONTROL_NAME | Unique output format control name |
| OPTIONAL_IND | Optional indication for the field<br>0 -> Mandatory<br>1 -> Optional |
| FIELD_TYPE_ID | Field type for this control (mathematical expression, substitution, user exit, etc.) |
| DATA_TYPE_ID | Data type (ASCII, Numeric, etc.) |
| DATA_LENGTH | Length of the data section for this type |
| TAG_VALUE | ASCII string to output as the tag part. |
| TAG_TYPE_ID | Data type that the tag is output as (ASCII String, ASCII Numeric, etc.) |
| LENGTH_TYPE_ID | Length type that the tag is output as (ASCII String, ASCII Numeric, etc.) |
| TAG_BEFORE_LENGTH_IND | If the field type is tag, length and data, this determines whether tag or length should be output first.<br>1 -> Tag first<br>0 -> Length first |
| LITERAL_OR_DEFAULT_VALUE | Literal value if the output type is a literal. Default value for types with default value. |
| LITERAL_OR_DEFAULT_LENGTH | Literal length if the output type is a literal. Default length for types with default value. |
| EXIT_ROUTINE | ASCII string which holds the name of the exit function, if the field type is exit routine. |
| OPERATION_ID | Actions to take during output reformatting, (such as left justify, right justify etc.) |
| NULL_ACTION_ID | ? |
| PREFIX_ID | Delimiter ids when literal strings are output before the rest of the control. |
| SUFFIX_ID | Delimiter ids when literal strings are output before the rest of the control. |
| PAD_CHARACTER_ID | This is the delimiter id when padding. |

Table: NN_math_expression

Repository for math expressions for output format controls of type mathematical expression.

| Name | Description |
|---|---|
| OUTPUT_FORMAT_CONTROL_ID | Output format control identifier references the output format control to which the math expression refers. |
| SEQ_NR | The sequence of a record within a math expression since math expressions can be an undefined length. |
| DECIMAL_PRECISION | The decimal precision to which to carry out the math calculations. |
| ROUNDING_MODE | The type of rounding to perform (round up or round down). |
| EXPRESSION | The segment containing either all or part of the actual mathematical expression. |

Table: code_table

Metadata describing pieces of formats (this is used internally for managing data the other tables and also in the GUI presentation layer).

| Name | Description |
|---|---|
| CODE_ID | Non-unique identifier for code type |
| CODE_TYPE | Non-unique code type (i.e. access mode, data type, parse controls, lengths, operations, etc.) |
| DESCRIPTION | Description of the code for a given type/id pair. |

Table: id_counter

Used in generating unique ids for each of the different types of format pieces.

| Name | Description |
|---|---|
| ID_TYPE | Type that a unique id is being generated for (format, field, delimiter, input parse control, output format control, output format substitute). |
| LAST_COUNT | Counter used to identify next unique id via increment. |

Table: related_code_table
Tied protocols & versions together.

| Name | Description |
| --- | --- |
| PARENT_CODE_ID | Id of parent in the code table |
| CHILD_CODE_ID | Id of child in the code table |
| PARENT_CODE_TYPE | Type of the parent in the code table |
| CHILD_CODE_TYPE | Type of the child in the code table |

Format Specifications

A rich set of format specifications is required to achieve the intended flexibility of dynamic formatting of the present invention. It is necessary that complex, repeating, recursive format definitions be available to describe a wide variety of highly complex messages. The present invention includes such a rich set of format definitions. Virtually any message can be described by combinations of the format controls of the present invention including: highly complex, hierarchically structured, and repeating message formats.

The database schema described above defines the structure of message formats as stored in the format repository. The following data types and related attributes and controls are supported by the dynamic formatter of the present invention.

Field Format Control Tool Window

Format Control Field

Description: "Format Control" describes whether the field is mandatory or optional in the output format.

| Value | Description |
| --- | --- |
| Mandatory | Field must appear in output message. |
| Optional | Field need not appear in output message. |

Format Control Type Field

Description: "Format control type" describes the type of formatting to perform on an output field.

| Values | Description |
| --- | --- |
| Data Field (Name Search) | Choose field from input message based on matching name. |
| Data Field (Field Search) | Choose field from input message based on matching tag value. |
| Literal | Field value is a literal. |
| Left Operand Field | Mark field as a "left operand". |
| Right Operand Field | Mark field as a "right operand". |
| Calculated Field | Perform a calculation using the left and right operand fields. |
| Conditional Field | Mark field as to be output only if "existence check field" exists. |
| Existence Check Field | Mark field as an "existence check" field. |
| Transformed Field | Perform the transformation in "Operation" on this field. |
| Mathematical Expression | Value should be computed based on an arithmetic expression. |
| Rules Field | Output format control should be chosen based on Boolean logic. |
| User Exit | Value of field should be computed by a user-written exit routine. |

Data Type Field

Description: "Data Type" defines the data type of the field in the output format.

| Data Type Field Values | Description |
| --- | --- |
| Not Applicable | No data type is assumed. |
| ASCII String | A string of ASCII characters. |
| ASCII Numeric | A string of ASCII numeric characters. |
| Binary Data | Sybase binary data type. |
| EBCDIC Data | Data is encoded in EBCDIC. |
| IBM Packed Integer | Standard IBM packed integer data type. |
| IBM Signed Packed Integer | Standard IBM signed packed integer data type. |
| IBM Zoned Integer | Standard IBM zoned integer data type. |
| IBM Signed Zoned Integer | Standard IBM signed zoned integer data type. |
| Decimal, International | International delimited decimal. Example: 12.345,67 |
| Decimal, U.S. | U.S. delimited decimal. Example: 44,444,444.44 |

Tag Data Type Field

Description: "Tag Data Type" defines the data type of the tag component of the field in the output format.

Values: (See "Data Type" field above.)

Length Data Type Field

Description: "Length Data Type" defines the data type of the length component of the field in the output format.

Values: (See "Data Type" field above.)

Operation Field

Description: "Operation" describes the kind of operation to perform on a transformed field in an output format.

| Value | Description |
| --- | --- |
| Not Applicable | No operation is performed. |
| Add | Add the left and right operand fields together. |
| Subtract | Subtract the right operand field from the left operand field. |
| Multiply | Multiply the left and right operand fields together. |
| Divide | Divide the left operand field by the right operand field. |
| Left Justify | Left justify the data in the field. |
| Right Justify | Right justify the data in the field. |
| Center | Center the data in the field. |
| Substitute String | Perform a code lookup based on the value of the input field. |
| Left Trim | Trim spaces to the left of the data. |
| Right Trim | Trim spaces to the right of the data. |
| Left and Right Trim | Trim spaces to the left and right of the data. |
| All lowercase | Convert ASCII data to all lowercase letters. |
| All UPPERCASE | Convert ASCII data to all uppercase letters. |

Mathematical Expression Tool Dialog Box

Rounding Mode Field

Description: "Rounding Mode" defines how the Formatter should round the results of an arithmetic expression.

| Value | Description |
|---|---|
| Up | Round up. |
| Down | Round down |

Field Parse Input Control Tool Window
  Parse Control Field
  Description: "Parse Control" describes whether the field is mandatory or optional in the input format.

| Value | Description |
|---|---|
| Mandatory | Field must appear in output message. |
| Optional | Field need not appear in output message. |

Parse Control Type Field
  Description: "Parse Control Type" describes the kind of field parsed by the Formatter.

| Value | Description |
|---|---|
| Data Only | Field has a data component only. |
| Tag & Data | Field has a tag and data component. |
| Tag, Length & Data | Field has a tag, length and data component. |
| Length & Data | Field has a length and data component. |
| Repetition Count | (Not used). |
| Literal | Field value is a literal. |
| Length, Tag & Data | Field has a length, tag and data component (in this order). |

Data Type Field
  Description: "Data Type" defines the data type of the field in the input format.
  Values: (See "Data Type" field in "Field Format Control Tool" window description above.)
  Tag Data Type Field
  Description: "Tag Data Type" defines the data type of the tag component of the field in the input format.
  Values: (See "Data Type" field in "Field Format Control Tool" window description above.)
  Length Data Type Field
  Description: "Length Data Type" defines the data type of the length component of the field in the input format.
  Values: (See "Data Type" field in "Field Format Control Tool" window description above.)
  Data Termination Field
  Description: "Data Termination" describes how the field is terminated in the input message.

| Value | Description |
|---|---|
| Not Applicable | No data termination. Read to end of message. |
| Delimiter | The field is terminated by a delimiter. |
| Exact Length | The field has a fixed length. |
| White Space Delimited | The field is terminated by white space. |
| Minimum Length + Delimiter | Parse a minimum number of characters and then look for delimiter. |
| Minimum Length + White Space | Parse a minimum number of characters and then look for white space. |

Tag Termination Field
  Description: "Data Termination" describes how the tag component of the field is terminated in the input message.
  Values: (See "Data Termination" field above.)
  Length Termination Field
  Description: "Length Termination" describes how the length component of the field is terminated in the input message.
  Values: (See "Data Termination" field above.)
Flat Input Format Window
  Format Termination Field
  Description: "Format Termination" defines how the format terminates in the input message.
  Values: (See "Data Termination" field in "Field Parse Input Control Tool" window description above.)
Add/Change Field Dialog Box
  Access Mode Field
  Description: "Access Mode" defines how the Formatter accesses fields in the input message to generate fields in the output message.

| Value | Description |
|---|---|
| Not Applicable | Accesses no field in the input message. |
| Normal Access | Accesses the first field encountered in the input message. |
| Access with Increment | When the last child of a parent is accessed, increment parent index. |
| Reset then Normal Access | After all children have been accessed, do normal access. |
| Reset then Access with Increment | After all children have been accessed, do access with increment. |
| Access the n-th Instance Of Field | Always access the nth instance of a field. |
| Access within Compound | Accesses child with same index as accessed in previous format. |
| Cycling Access, stay in Compound | When the last field in a compound is accessed, go back to first field. |
| Access using relative index | Always accesses the field after the previous one accessed. |

Add/Change Input Format Dialog Box
  Repeat Termination Field
  Description: "Repeat Termination" defines how a repeating component format terminates in the input message.

| Value | Description |
|---|---|
| Not Applicable | No format termination. |
| Delimiter | The format is terminated by a delimiter. |
| White Space | The format is terminated by white space. |
| Exact Count | Their is an exact count of repeating formats. |
| Field Contains Repeat Count | A field in a component format contains the number of occurrences of the repeating component. |

Add/Change Output Format Window
Repeat Termination Field
Description: "Repeat Termination" defines how the repeating component format terminates in the output message.

| Value | Description |
| --- | --- |
| Not Applicable | No format termination. |
| Delimiter | The format is terminated by a delimiter. |

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A computer operable method for reformatting an input message to generate an output message comprising the steps of:

providing an input message having an input message format description associated therewith, said input message format description including at least one input field description each having a field ID value associated therewith;

providing an output message format description including at least one output field description each having a field ID value associated therewith;

for each output field description in said output message format description, performing the steps of:

locating an input field description in said input message format description of said input message, wherein said input field description has a field ID value equal to the field ID value associated with said each output field description of said output message format description; and transforming, in response to successfully locating said input field description, an input field value in said input message and described by said input field description into an output field value in accordance with said output field description of said output message format description.

2. The method of claim 1 further comprising the steps of:

parsing said input message to identify at least one input field value in accordance with said at least one input field description of said input message format description; and associating, in an entry of a table, said at least one input field value with said field ID value associated with said at least one input field description.

3. The method of claim 1 wherein one of said at least one input field description is a compound input field description hierarchically comprised of zero or more branch nodes and at least one leaf node, wherein said branch nodes represent additional compound input field descriptions and wherein said at least one leaf node represents at least one non-compound input field description each associated with a field ID value, and wherein the method further comprises the steps of:

recursing, until all of said at least one leaf node are parsed, the step of parsing for each of said zero or mode branch nodes to find all of said at least one leaf node in said compound input field description; and repeating, a number of times determined by the number of said at least one leaf node in said compound input field description, the steps of parsing and associating to identify a plurality of input field values in accordance with each of said at least one non-compound input field description of said input message format description and to associate each of said plurality of input field values with said field ID value associated with said at least one non-compound input field description.

4. The method of claim 1 wherein one of said at least one output field description is a repeating output field description and wherein the step of translating further comprises the step of:

repeating the steps of locating and translating to generate a plurality of output field values in accordance with said one of said at least one output field description, wherein the number of repetitions is determined in accordance with the input field values.

5. The method of claim 2 wherein said input message comprises a plurality of input field values and wherein said input message format description includes a plurality of input field descriptions each having a field ID value associated therewith.

6. The method of claim 2 wherein one of said at least one input field description is a repeating input field description having a repetition limit associated therewith and wherein the method further comprises the step of:

repeating, a number of times determined by said repetition limit, the steps of parsing and associating to identify a plurality of input field values in accordance with said at least one input field description of said input message format description and to associate each of said plurality of input field values with said field ID value associated with said at least one input field description.

7. The method of claim 1 wherein one of said at least one output field description is a compound output field description hierarchically comprised of zero or more branch nodes and at least one leaf node, wherein said branch nodes represent additional compound output field descriptions and wherein said at least one leaf node represents at least one non-compound output field description each associated with a field ID value, and wherein the step of translating further comprises the steps of:

recursing the step of translating for each of said zero or more branch nodes to find all of said at least one leaf node in said compound output field description; and repeating the step of translating an input field value to an output field value for each of said at least one leaf node in said compound output field description, wherein the number of repetitions is determined in accordance with the input field values.

8. The method of claim 5 further comprising the step of:

indexing a plurality of entries in said table wherein each of said plurality of entries associates one input field value of said plurality of input field values with a field ID value of one of said plurality of field descriptions of said input message format description, wherein said plurality of entries are indexed according to the value of said field ID value of each of said plurality of entries.

9. In a distributed computing environment with N computing processes which communicate with one another by exchanging messages, where N is an integer of at least 3 and the messages from different computing processes have different message formats, a method of reformatting the messages comprising the steps of:

providing a format repository with a plurality of message format descriptions that are each associated with a message format of one of the computing processes; then receiving an input message from one of the computing processes;

retrieving an input message format description from the format repository that is associated with the input message;

parsing the input message in accordance with the input message format description;

receiving a request for an output message from another one of the computing processes; and generating the output message using the parsed input message and the request.

10. The method of claim 9 wherein the message format descriptions contain descriptive configuration and structural information regarding message format and are devoid of message data.

11. The method of claim 9 further comprising the step of:
generating the output message using a portion of the parsed input message selected by the request.

12. The method of claim 9 further comprising the step of:
generating the output message using all of the parsed input message.

13. The method of claim 9 further comprising the steps of:
constructing an input format K-tree corresponding to the input message format description; and
generating the output message using the input format K-tree.

14. The method of claim 9 further comprising the steps of:
retrieving an output message format description from the format repository that is associated with the output message; and
generating the output message using the output message format description.

15. The method of claim 14 further comprising the steps of:
constructing an output format K-tree corresponding to the output message format description; and
generating the output message using the output format K-tree.

16. The method of claim 14 further comprising the steps of:
locating an input field ID value in the input message format description;
locating an output field ID value in the output message format description; and
transforming an input field value in the input message into an output field value in the output message in response to detecting a match between the input field ID and the output field ID.

17. In a distributed computing environment with N computing processes which communicate with one another by exchanging messages, where N is an integer of at least 3 and the messages from different computing processes have different message formats, a method of reformatting the messages so that the N computing processes are compatible with one another, the method comprising the steps of:
providing a format repository that includes N message format descriptions, wherein each of the message format descriptions is associated with a message format of one of the computing processes, contains descriptive configuration and structural information regarding message format and is devoid of message data; then receiving an input message from one of the computing processes, wherein the input message includes message data;

retrieving an input message format description from the format repository that is associated with the input message;

constructing an input format K-tree corresponding to the input message format description, wherein the input format K-tree contains descriptive configuration and structural information regarding message format and is devoid of message data;

parsing the input message in accordance with the input message format description to provide a parsed input message in canonical form;

receiving a request for an output message from another of the computing processes;

retrieving an output message format description from the format repository that is associated with the output message;

constructing an output format K-tree corresponding to the output message format description, wherein the output format K-tree contains descriptive configuration and structural information regarding message format and is devoid of message data; and generating the output message using the parsed input message, the input format K-tree and the output format K-tree, wherein the output message contains at least some of the message data in the input message.

18. The method of claim 17 further comprising the step of:
generating the output message in accordance with a structure and sequence determined by the output format K-tree.

19. The method of claim 17 further comprising the steps of:
locating an input field ID value in the input message format description;
locating an output field ID value in the output message format description; and
transforming an input field value in the input message into an output field value in the output message in response to detecting a match between the input field ID and the output field ID.

20. The method of claim 17 further comprising the steps of:
adding an N+1 computing process to the distributing computing environment, wherein the N+1 computing process has a different message format than the other N computing processes; and
adding an N+1 message format description to the format repository that is associated with the N+1 computing process, contains descriptive configuration and structural information regarding message format and is devoid of message data, thereby providing message exchange compatibility between the N+1 computing process and the other N computing processes.

* * * * *